United States Patent [19]

Le Van Mao et al.

[11] Patent Number: 4,975,402
[45] Date of Patent: Dec. 4, 1990

[54] CATALYST FOR AROMATIZATION OF OLEFINS AND PARAFFINS

[75] Inventors: Raymond Le Van Mao, Saint-Laurent; Louise Dufresne, Brossard, both of Canada

[73] Assignee: Concordia University, Montréal, Canada

[21] Appl. No.: 360,136

[22] Filed: Jun. 1, 1989

[30] Foreign Application Priority Data

Feb. 21, 1989 [CA] Canada ................................. 592374

[51] Int. Cl.⁵ .............................................. B01J 29/06
[52] U.S. Cl. ...................................... 502/69; 502/68; 502/71; 502/79; 502/76
[58] Field of Search .................. 502/63, 68, 69, 71, 502/79, 61, 76, 64

[56] References Cited

U.S. PATENT DOCUMENTS

| | | | |
|---|---|---|---|
| 4,036,902 | 7/1977 | Gregory | 585/417 |
| 4,150,061 | 4/1979 | Feinstein et al. | 585/752 |
| 4,180,516 | 12/1979 | Chang et al. | 502/71 |
| 4,543,347 | 9/1985 | Heyward et al. | 502/73 |
| 4,590,321 | 5/1986 | Chu | 585/407 |
| 4,590,322 | 5/1986 | Chu | 585/407 |
| 4,590,323 | 5/1986 | Chu | 585/407 |
| 4,636,483 | 1/1987 | Kiell et al. | 502/71 |

FOREIGN PATENT DOCUMENTS 251711 11/1987 German Democratic Rep. ... 502/71

*Primary Examiner*—Olik Chaudhuri
*Assistant Examiner*—George R. Fourson
*Attorney, Agent, or Firm*—Juliusz Szereszewski

[57] ABSTRACT

An aromatization catalyst is obtained by physical mixing of a pentasil type zeolite, for example H-ZSM-5 and a zinc oxide-alumina co-precipitate. The weight ratio of the zeolite to the co-precipitate ranges from 4.3 to 28.3. The Zn/Al atomic ratio in the co-precipitate may range from about 0.16 to 25.0. The composite catalyst yields greater amounts of aromatics, particularly BTX aromatics, when contacted with an olefinic and/or paraffinic feedstock than the respective zeolite alone.

14 Claims, No Drawings

CATALYST FOR AROMATIZATION OF OLEFINS AND PARAFFINS

BACKGROUND OF THE INVENTION

This invention relates to catalysts suitable for catalytic aromatization of olefins and paraffins the catalysts comprising ZSM-5 or ZSM-11, to a method of making such catalysts and to an aromatization process using same.

Aromatic hydrocarbons are important commodity chemicals in the petroleum industry. The most commercially valuable aromatics are the BTX compounds (benzene, toluene, ethylbenzene and xylenes). Aromatics are currently produced by catalytic cracking of naphthas, catalytic reforming of various petroleum feedstocks etc. They can also be produced by catalytic conversion of alcohols (particularly methanol) or olefins. The catalysts used in these processes (methanol-to-gasoline or MTG, olefins-to-gasoline-and-distillate, or MOGD or M2 Forming, both developed by Mobil Oil) belong to the pentasil zeolite family whose most important member in terms of industrial applications is the ZSM-5 structure. The latter is a tridimensional crystalline aluminosilicate having strong acid sites and whose intermediate pore (or channel) system displays a reaction shape selectivity which leads to the production of substantial amounts of monoaromatics.

In the M2 Forming and MOGD processes, the ZSM5 in the acid, or hydrogen, form is used alone without any cocatalyst which would promote the aromatizing action of the catalyst component itself.

Zinc oxide and alumina are known as catalysts or modifiers of zeolite catalysts for the purpose of hydrocarbon aromatization. A number of references discloses the use of various metal cations to modify the zeolite pore diameter to favor the formation of the para-isomer of dialkylaromatics.

U.S. Pat. No. 3,325,552 issued to Wennerberg discloses an aromatizing catalyst comprising three different metal oxides: zinc oxide, magnesia and alumina.

U.S Pat. No. 4,036,902 (Gregory) teaches an aromatization catalyst comprising alumina promoted by zinc or a zinc compound.

U.S. Pat. No. 4,590,322 (Chu) discloses a process for producing aromatic hydrocarbons using a catalyst comprising a zeolite such as ZSM-5 which contains optionally a difficultly reducible oxide incorporated into the zeolite to enhance the para-selectivity properties of the catalyst modified therewith. This patent, as well as U.S. Pat. Nos. 4,590,321 and 4,590,323 issued to the same inventor, teach that zeolites may be composited with a porous matrix material such as alumina, and with some binary or ternary oxide compositions in the form of a cogel. The cogel, which may include zinc oxide and/or aluminum oxide is incorporated into the structural lattice of zeolite particles.

Zinc is also an aromatization promoter when incorporated into the zeolite lattice by ion exchange or by impregnation as taught in Chang et al. U.S. Pat. No. 3,894,104. However, zinc and other modifying ions/metals, according to the Chang patent, must be in close contact with the zeolite acid sites in such a way as to be able to effect the promoting action on the aromatizing acid sites over very short distances, not exceeding a few Angstroms.

Moreover, it is known to obtain certain catalysts by mixing the components physically. Canadian Patent No. 1,204,099 (Heyward) discloses a catalytic composition for conversion of synthesis gas to hydrocarbons, the composition comprising a mixture of a tectometallosilicate, e.g. a zeolite, zinc oxide, an oxide of gallium or indium and an oxide of an additional metal selected from the elements of Group 1B, lll-V, VlB, VllB and Vlll.

U.S. Pat. No. 4,538,017 (Butler) uses a catalyst composed of silicalite and zinc oxide for the aromatization of paraffinic feedstocks.

SUMMARY OF THE INVENTION

It has now been discovered that high yields of aromatics, particularly BTX aromatics, may be obtained by contacting a feedstock containing paraffins and/or olefins with a composite catalyst comprising a mixture of pentasil type zeolite (ZSM-5 or ZSM-11) and a zinc oxide/alumina co-precipitate.

According to one aspect of the invention, there is provided an aromatization catalyst comprising a mixture of two basic components, a pentasil zeolite and a co-precipitate of zinc oxide and aluminum oxide. The pentasil type zeolite may have the structure of ZSM-5 or ZSM-11. The silicon-to-aluminum atomic ratio of the zeolite is preferably in the range from 25 to 50. The catalyst may contain a binder to facilitate its use. The weight ratio of the zeolite to the co-precipitate is in the range from 4.3 to 28.3.

According to another aspect of the invention, there is provided a method of preparing a composite catalyst suitable for the aromatization of olefins and/or paraffin, the method which comprises (a) reacting a liquid mixture of a soluble zinc salt and a soluble aluminum salt with an alkaline precipitating agent capable of precipitating the oxides of zinc and aluminum and separating the resulting precipitate;

(b) drying the co-precipitate, (c) mixing intimately the co-precipitate with a pentasil type zeolite at a zeolite-to-precipitate ratio from 4.3 to 28.3, (d) activating the catalyst at an elevated temperature.

The pentasil type zeolite may have the structure of ZSM-5 or ZSM-11.

The method may also comprise adding a binder to the mixture of the zeolite and the co-precipitate and forming the resulting co-catalyst into discrete pieces. To facilitate such forming, a liquid may be added to the mixture.

The relative amounts of the zinc and aluminum salts and of the zeolite are selected according to the desired ratio of the components in the final product.

According to another aspect of the invention, there is provided a process for converting a feedstock comprising at least one olefinic hydrocarbon, at least one paraffinic hydrocarbon or a mixture thereof, to aromatic hydrocarbons. The process comprises contacting said feedstock under sufficient aromatization conditions with a composite aromatization catalyst, said catalyst comprising a mixture of (a) a pentasil zeolite having the structure of ZSM5 or ZSM-11 and (b) a co-precipitate of zinc oxide and alumina.

The composite catalyst of the invention based on ZSM-5, has been found to give greater yields of aromatics and particularly BTX aromatics than a non-modified ZSM-5 zeolite in the hydrogen form. In view of the structural similarities between ZSM-5 and ZSM-11, it would be reasonable to predict analogous results for ZSM-11 based catalysts according to this invention.

As used in this specification, the term "zeolite having the structure of ZSM-5" (or ZSM-11) is meant to include zeolites in which the aluminum atoms are substituted totally or in part by other atoms, e.g. gallium.

Zinc oxide-aluminum oxide co-precipitate constitutes an acidic component of the composite catalyst. It may be assumed that this component, in the presence of a pentasil zeolite, behaves as a hydrogen "trap" thus scavenging the hydrogen species released during the aromatization of olefinic and/or paraffinic compounds. The aromatization reaction occurs within the zeolite channels and the generated hydrogen species migrate to the co-precipitate particles located at the outside of the zeolite particles.

DETAILED DESCRIPTION OF THE INVENTION

Pentasil zeolites have been known for a number of years. The ZSM-5 zeolite is described and claimed in U.S. Pat. No. 3,702,886. ZSM-11 is described in U.S. Pat. No. 3,709,979. The gallium component is optionally incorporated into the zeolite structure during the synthesis phase of the pentasil zeolite or incorporated (by ion-exchange/impregnation) into the pentasil zeolite pores.

The preparation of an exemplary composite aromatization catalysts of the invention is described below.

A. Preparation of Zinc Oxide/Alumina Co-Precipitate

A liquid mixture of soluble zinc nitrate (hexahydrate) and aluminum sulfate (decaoctahydrate) is obtained. To the mixture is added dropwise ammonium hydroxide (28 vol. %) under rigorous stirring, the temperature of the mixture being maintained at ca. 50° C. The ammonium hydroxide is added until a constant pH of 7.5±0.1 is reached and maintained for about 2 hours. The resulting slurry is allowed to age without agitation for about 70 hours. The solids are washed with water by decantation two to four times so as to remove most of the soluble ammonium salts. The Solution is then evaporated to leave dry solids which are activated in air at 550° C. for 10 hours.

The co-precipitate was characterized by atomic absorption, X-ray powder diffraction, SEM, adsorption and temperature programmed desorption of ammonia. A calibration graph predicting the resulting oxide concentrations was established. In particular, it was seen that to obtain a Zn/Al molar ratio ranging from 0.16 to 25, the Zn/Al ratio in the starting salt mixture needed to be comprised between 0.33 and 99.

To determine the acid site density on the zeolite surface as well as that of the co-precipitate, ammonia was adsorbed on the zeolite or co-precipitate at room temperature. After thorough flushing with helium for half an hour to remove physisorbed ammonia, the "chemisorbed" ammonia was desorbed by linearly increasing the temperature at a rate of 15° C./min, form room temperature to 530° C. A gas chromatograph equipped with a thermal conductivity detector (TCD) and set on-line with the system, was used to detect the desorbed ammonia in the outlet stream. Known amounts of ammonia were injected into the gas chromatograph so that the TCD responses could be reported as acidity density (milliequivalents/g.)

B. Preparation of Zeolite

The ZSM-5 zeolite was synthesized according to U.S. Pat. No. 3,702,886. The composition of the synthesis gel and the synthesis parameters were selected so that the resulting zeolites had a Si/Al atomic ratio ranging from 25 to 50.

The zeolite was converted into the hydrogen form, or acid form (H-ZSM-5) by ion-exchange with a 5 wt. % ammonium chloride solution. The resulting zeolite form was characterized by various techniques such as x-ray powder diffraction, atomic absorption, scanning electron microscopy, absorption and desorption of ammonia.

Optionally, gallium was incorporated during the synthesis of the pentasil zeolite, to replace entirely or in part the aluminum atoms within the zeolite structure. Gallium could also be incorporated to the zeolite structure (acid form) by ion-exchange and/or impregnation. As a result, the zeolite component may contain gallium oxide in the amount from 0.5% to 5% based upon the weight of the zeolite component.

C. Preparation of the Composite Catalyst

To prepare the final catalyst, the H-ZSM-5 zeolite powder (mesh size number higher than 60) and the zinc oxide/aluminium oxide co-precipitate powder (mesh size number higher than 60), were mechanically and intimately mixed at room temperature. Then, bentonite (up to 60 wt %) was added and also intimately mixed with the solid catalyst. Water was added dropwise until a malleable paste was obtained. The latter was extruded into 1 mm O.D. "spaghettis". The final extrudates were dried at 120° C. for several hours and activated in air at 550° C. for about 10 hours.

D. Additives

In some tests, the co-precipitate was doped with NiO in the amount of 0.5 wt % to 3 wt % of the co-precipitate, by adding a nickel nitrate solution to the co-precipitate stirring, evaporation and activation at ca. 550° C.

The composite catalyst in the extrudate form was loaded in a tubular reactor and heated by a digitally controlled electrical furnace. The feed consisted of the products of steam-cracking of propane. The usual reaction parameters of the reactor were: temperature — 500° C. or 540° C., duration of a run=4 hours, weight hourly space velocity (W.H.S.V)=1.5 $h^{-1}$.

The liquid hydrocarbons formed by the catalytic reaction were collected in a flask kept at −15° C. while the gases were analyzed on-line using a Shimadzu GC (Model Mini 3, FID) equipped with a 2.5 m packed column (15 wt % squalane on Chromosorb P). The collected liquid phases were subsequently analyzed with a Hewlett-Packard GC (Model 5790 A, FID) equipped with a 50 m PONA type capillary column.

The following examples and tables are illustrative of the performance of the catalyst of the invention.

Table 1 shows the compositions of the gaseous product mixtures (A1 and A2) used as feeds in the catalytic aromatization tests. The compositions vary to a small extent as a result of somewhat different temperatures of a steam-cracking process generating the respective compositions.

TABLE 1

COMPOSITIONS OF GASEOUS FEED STREAMS GENERATED BY STEAM-CRACKING.

| Product distribution (wt %) | A1 | A2 |
|---|---|---|
| methane | 19.0 | 23.3 |
| ethylene | 34.8 | 41.1 |
| ethane | 2.2 | 2.6 |
| propylene | 17.8 | 15.9 |
| propane | 22.8 | 13.9 |
| butanes | 0.5 | 0.1 |
| butenes (butadienes) | 2.9 | 3.1 |
| Total | 100.0 | 100.0 |

EXAMPLE 1 (COMPARATIVE)

A H-ZSM-5 zeolite sample having a Si/Al atomic ratio of 37, hereinafter referred to as H-ZSM-5 (37) was tested at 500° C., WHSV=1.5 h$^{-1}$. The sample contained 40 wt % H-ZSM-5 (37) and 60 wt % bentonite. The feed had the composition of A1 (Table 1). The amount of catalyst was 4 g. The product distribution of this comparative catalyst is reported in Col. 1 of Table 2.

EXAMPLE 2 (COMPARATIVE)

A sample containing 40 wt % of the ZnO/Al$_2$O$_3$ co-precipitate (Zn/Al atomic ratio=0.39) obtained as described above, and 60 wt % of bentonite was tested under the same conditions and with the same feed as in Example 1. The product distribution is shown in Col. 2 of Table 2.

EXAMPLE 3

A sample containing 40 wt % H-ZSM-5 (37), 40 wt % co-precipitate (obtained as described above) and 20% bentonite was tested under the same conditions and with the same feed as in Example 1. The ZnO/Al$_2$O$_3$ coprecipitate has Zn/Al atomic ratio of 0.16. The resulting product distribution is shown in Col. 3 of Table 2.

EXAMPLES 4-7

In these examples, only the Zn/Al atomic ratio of the co-precipitate varied as follows: Example 4—0.39, Example 5—1.0, Example 6—2.5 and Example 7—24. The other conditions were similar as in Example 3. The resulting product distribution is shown in Columns 4-7 of Table 2 respectively.

EXAMPLE 8 (COMPARATIVE)

A sample containing 80 wt % of H-ZSM-5 (37) and 20 wt % bentonite was tested at similar conditions as in Example 1 except that the feed was now A2 (Table 1). The resulting product composition is shown in Table 2, Col. 8.

EXAMPLE 9

A sample of the composite catalyst of the invention containing 75 wt % H-ZSM-5 (37), 5 wt % co-precipitate (Zn/Al atomic ration=1) and 20 wt % bentonite was tested. The conditions and feed were similar as in Example 8. The product distribution is shown in Col. 9 of Table 2.

EXAMPLE 10 (COMPARATIVE)

A 4 g sample containing 80 wt % H-ZSM-5 (37) and 20% bentonite was tested at 500° C., WHSV=ca 0.6 h$^{-1}$. The feed was propane. The product distribution is shown in Col. 10 of Table 2.

EXAMPLE 11

A 4 g sample containing 75 wt % H-ZSM-5 (37) 5 wt % coprecipitate (Zn/Al atomic ration=1) and 20 wt % bentonite was tested at similar conditions and feed as in Example 10. The product distribution is shown in Col. 11 of Table 2.

EXAMPLE 12 (COMPARATIVE)

In this example, the temperature was 540° C. The sample and catalytic conditions were similar as in Example 10. The product distribution is shown in Col. 12 of Table 2.

EXAMPLE 13

In this example, the temperature was 540° C. The catalyst sample and the conditions were similar as in Example 11. The product distribution is indicated in Col. 13 of Table 2.

TABLE 2

AROMATIZATION RESULTS OBTAINED WITH H-ZSM-5 (37)

| | EXAMPLE NUMBER (Zn/Al atomic ratio) | | | | | | | EXAMPLE NUMBER | |
|---|---|---|---|---|---|---|---|---|---|
| | 1 | 2 | 3 (0.16) | 4 (0.39) | 5 (1.0) | 6 (2.5) | 7 (24.0) | 8 | 9 |
| PRODUCT DISTRIBUTION (Wt %) | | | | | | | | | |
| METHANE | 19.6 | 19.3 | 19.9 | 20.5 | 20.0 | 18.5 | 20.8 | 24.1 | 24.2 |
| ETHYLENE | 34.4 | 38.1 | 18.6 | 22.4 | 15.9 | 16.0 | 17.4 | 8.2 | 7.8 |
| ETHANE | 2.0 | 1.9 | 3.2 | 3.4 | 8.1 | 8.5 | 11.3 | 4.1 | 6.4 |
| PROPYLENE | 11.8 | 13.3 | 11.3 | 8.5 | 7.7 | 8.7 | 8.4 | 9.5 | 4.8 |
| PROPANE | 19.3 | 17.2 | 26.1 | 19.5 | 23.8 | 25.3 | 21.7 | 22.0 | 18.3 |
| BUTANES | 1.1 | 3.1 | 1.8 | 1.6 | 1.3 | 1.3 | 1.0 | 4.6 | 2.3 |
| BUTENES (+ BUTADIENES) | 3.5 | 1.1 | 4.0 | 3.9 | 1.9 | 2.0 | 1.9 | 3.9 | 1.5 |
| C$_5$+ ALIPHATICS* | 3.7 | 1.9 | 3.3 | 3.7 | 2.3 | 2.7 | 2.2 | 3.5 | 1.5 |
| AROMATICS | 4.7 | 4.2 | 11.9 | 16.5 | 19.0 | 17.1 | 15.3 | 20.3 | 33.2 |
| Total | 100.1 | 100.1 | 100.1 | 100.0 | 100.0 | 100.1 | 100.0 | 100.0 | 100.0 |
| BTX/TOTAL AROMATICS (Wt %) | 81.8 | 63.4 | 87.5 | 86.6 | 87.7 | 87.4 | 89.1 | 88.0 | 91.0 |
| COMPOSITION OF THE BTX AROMATICS (Wt %) | | | | | | | | | |
| BENZENE | 62.5 | 85.3 | 30.0 | 28.9 | 30.1 | 25.1 | 31.1 | 28.7 | 31.7 |
| TOLUENE | 12.0 | 2.7 | 36.3 | 35.0 | 33.7 | 35.0 | 33.1 | 37.8 | 38.5 |
| ETHYLBENZENE | 7.6 | 1.4 | 6.9 | 9.7 | 7.6 | 8.4 | 7.5 | 4.9 | 5.5 |
| XYLENES | 16.1 | 1.7 | 26.5 | 26.0 | 28.2 | 31.2 | 27.7 | 28.5 | 24.1 |

TABLE 2-continued

| AROMATIZATION RESULTS OBTAINED WITH H-ZSM-5 (37) | | | | | | | | | |
|---|---|---|---|---|---|---|---|---|---|
| STYRENE | 1.8 | 8.9 | 0.3 | 0.4 | 0.4 | 0.4 | 0.6 | 0.1 | 0.2 |
| Total | 100.0 | 100.0 | 100.0 | 100.0 | 100.0 | 100.1 | 100.0 | 100.0 | 100.0 |

| | EXAMPLE NUMBER | | | | | | | |
|---|---|---|---|---|---|---|---|---|
| | 10 | 11 | 12 | 13 | 14 | 15 | 16 | 17 |
| PRODUCT DISTRIBUTION (Wt %) | | | | | | | | |
| METHANE | 3.8 | 1.9 | 11.3 | 4.6 | 4.8 | 3.6 | 8.8 | 6.5 |
| ETHYLENE | 3.3 | 1.3 | 9.0 | 1.6 | 4.7 | 1.7 | 8.2 | 1.7 |
| ETHANE | 2.0 | 4.4 | 5.5 | 10.9 | 8.5 | 7.1 | 13.7 | 13.8 |
| PROPYLENE | 2.8 | 5.0 | 7.2 | 7.8 | 5.8 | 4.0 | 8.6 | 4.3 |
| PROPANE | 83.9 | 71.4 | 49.1 | 47.4 | 37.3 | 10.9 | 27.3 | 11.2 |
| BUTANES | 2.8 | 1.9 | 2.6 | 1.0 | 24.3 | 41.3 | 14.3 | 11.4 |
| BUTENES (+ BUTADIENES) | 0.7 | 0.8 | 1.7 | 0.8 | 2.1 | 3.5 | 2.8 | 3.0 |
| $C_5^+$ ALIPHATICS | 0.2 | 0.1 | 1.2 | 0.2 | 1.7 | 1.6 | 1.2 | 0.9 |
| AROMATICS | 0.5 | 13.2 | 12.5 | 25.7 | 10.8 | 26.4 | 15.2 | 47.3 |
| Total | 100.0 | 100.0 | 100.1 | 100.0 | 100.0 | 100.1 | 100.1 | 100.1 |
| BTX/TOTAL AROMATICS (Wt %) | 96.0 | 93.4 | 89.6 | 94.1 | 91.0 | 94.4 | 93.3 | 92.3 |
| COMPOSITION OF THE BTX AROMATICS (Wt %) | | | | | | | | |
| BENZENE | 87.5 | 40.3 | 24.4 | 41.8 | 21.5 | 28.8 | 28.8 | 28.2 |
| TOLUENE | 4.2 | 36.5 | 43.7 | 40.2 | 45.3 | 39.6 | 46.1 | 42.9 |
| ETHYLBENZENE | — | 0.9 | 3.5 | 1.1 | 2.6 | 2.1 | 1.5 | 1.1 |
| XYLENES | 8.3 | 22.1 | 28.2 | 16.6 | 30.5 | 29.4 | 23.6 | 27.5 |
| STYRENE | — | 0.2 | 0.2 | 0.3 | — | 0.2 | 0.1 | 0.3 |
| Total | 100.0 | 100.0 | 100.0 | 100.0 | 99.9 | 100.1 | 100.1 | 100.0 |
| | PROPANE CONVERSION (Wt %) | | | | n-butane conversion (wt %) | | | |
| | 16.1 | 28.6 | 50.9 | 52.6 | 85.0 | 71.3 | 88.5 | 92.2 |

*$C_5^+$ ALIPHATICS - aliphatic hydrocarbons with at least 5 carbon atoms in the molecule.

EXAMPLE 14

The conditions in this example were similar as in Example 10, except that the feed was butane. The product distribution is shown in Col. 14 of Table 2.

EXAMPLE 15

The conditions in this example were similar as in Example 11 except that the feed was butane. The product distribution is shown in Col. 15 of Table 2.

EXAMPLE 16

The conditions in this example were similar as in Example 12 except that the feed was butane. The product distribution is shown in Col. 16 of Table 2.

EXAMPLE 17

The conditions in this example were similar as in Example 13, except for butane being substituted for propane. The product distribution is indicated in Col. 17 of Table 2.

In the examples 1-17, described above, the H-ZSM-5 zeolite had a degree of crystallinity of 100% and a Si/Al atomic ratio of 37. In the examples 18-22, set forth below, the zeolite was H-ZSM-5 with a degree of crystallinity of 94% and a Si/Al atomic ratio of 34, hereinafter referred to as H-ZSM-5 (34).

EXAMPLES 18-22

Samples containing varying amounts of H-ZSM-5 (34), $ZnO/Al_2O_3$ co-precipitate (Zn/Al atomic ratio=1) and 20 wt % bentonite were tested at 500°, WHSV=1.5 $hr^{-1}$ The feed was A2 (Table 1). The resulting product distribution versus the composition of the samples is shown in columns 18-22 of Table 3 respectively.

The results, as outlined hereinabove, show a greatly enhanced aromatization activity of the ZSM-5 zeolite by addition of even small amounts of zinc oxide/aluminum oxide co-precipitate by mixing. It appears that the amount of bentonite, or another binder, used in the composition, does not play any role in the aromatization process and therefore that amount should be kept at a reasonable minimum. The optimum ratio of the zeolite to the co-precipitate appears to be from about 15 to about 7.

TABLE 3

| AROMATIZATION RESULTS OBTAINED WITH H-ZSM-5 (34) | | | | | |
|---|---|---|---|---|---|
| | Example Number: | | | | |
| | 18 | 19 | 20 | 21 | 22 |
| H-ZSM-5 zeolite (wt %) | 80 | 75 | 70 | 60 | 40 |
| ZN/Al oxides co-precipitate (wt %) | 0 | 5 | 10 | 20 | 40 |
| bentonite (wt %) | 20 | 20 | 20 | 20 | 20 |
| PRODUCT DISTRIBUTION (wt %) | | | | | |
| Methane | 20.3 | 22.1 | 18.6 | 20.4 | 19.5 |
| Ethylene | 8.8 | 8.4 | 7.6 | 12.9 | 12.4 |
| Ethane | 3.7 | 5.5 | 5.3 | 7.3 | 13.0 |
| Propylene | 6.9 | 5.6 | 4.8 | 6.7 | 7.3 |
| Propane | 29.5 | 19.8 | 26.2 | 21.3 | 22.0 |
| Butanes | 4.4 | 2.2 | 1.9 | 1.5 | 1.0 |

TABLE 3-continued
AROMATIZATION RESULTS OBTAINED WITH H-ZSM-5 (34)

| | Example Number: | | | | |
|---|---|---|---|---|---|
| | 18 | 19 | 20 | 21 | 22 |
| Butanes (+ butadienes) | 3.3 | 1.7 | 1.3 | 1.7 | 1.5 |
| $C_5^+$ aliphatics | 3.1 | 2.1 | 1.6 | 2.2 | 1.8 |
| Aromatics | 13.0 | 32.6 | 32.7 | 26.0 | 21.6 |
| BTX/Total aromatics (%) | 87 | 90 | 90 | 90 | 88 |
| Composition of the BTX aromatics (wt %) | | | | | |
| Benzene | 28.2 | 32.5 | 32.0 | 33.4 | 29.6 |
| Toluene | 38.3 | 39.2 | 39.6 | 35.7 | 37.7 |
| Ethylbenzene | 3.9 | 4.6 | 4.8 | 6.2 | 4.7 |
| Xylenes | 29.6 | 23.5 | 23.4 | 24.4 | 27.3 |
| Styrene | 0.1 | 0.2 | 0.2 | 0.3 | 0.7 |
| Total | 100.1 | 100.0 | 100.0 | 100.0 | 100.0 |

It has been shown that such a co-precipitate alone does not produce aromatics to a significant extent (Col. 2 of Table 2). The optimum Zn/Al atomic ratio of the co-precipitate is ca. 1.0.

EXAMPLE 23 (comparative)

A catalyst prepared from a H-ZSM-5 zeolite having a Si/Al ratio of 34 and a $Na_2O$ content lower than 0.1 wt %, was tested at 500° C. and at a W.H.S.V. of 1.3 $h^{-1}$(weight of catalyst=4 g). This catalyst contained 80 wt % of zeolite and 20 wt of bentonite. The feed had the composition of Al (Table 1). The product distribution obtained with this catalyst is reported in Table 4, col. 23.

EXAMPLE 24 (comparative)

A sample containing 75 wt % of the H-ZSM-5 zeolite of example 23, 5 wt % of ZnO-alumina coprecipitate (Zn/Al atomic ratio=1.0) and 20 wt % of bentonite was tested under the same reaction conditions and with the same feed as in example 23. The product distribution obtained with such a catalyst is reported in Table 4, col. 24.

EXAMPLE 25

A catalyst containing 75 wt % of the zeolite of example 23 and 5 wt % of ZnO/alumina coprecipitate (Zn/Al atomic ratio=1) which had been previously impregnated with nickel nitrate (1.5 wt % as NiO), and of 20 wt % of bentonite was tested under the same reaction conditions and with the same feed as example 23. The product distribution obtained with such a catalyst is reported in Table 4, col. 25.

EXAMPLE 26 (comparative)

A catalyst containing 80 wt % of H-ZSM-5 zeolite (Si/Al=30 and $Na_2O$<0.1 wt %) and 20% of bentonite, was tested at 500° C. and W.H.S.V.=1.5 $h^{-1}$(catalyst weight=4 g). The feed had the composition of Al (Table 1). The product distribution obtained with such a catalyst is reported in Table 5, col. 26.

EXAMPLE 27 (comparative)

A catalyst containing 75 wt % of the zeolite of example 26, 5 wt % of ZnO/alumina coprecipitate (Zn/Al atomic ratio=1) and 20 wt % of bentonite was tested under the same reaction conditions and with the same feed as example 26. The product distribution obtained with such a catalyst is reported in Table 5, col. 27.

EXAMPLE 28

The H-ZSM-5 zeolite of example 26 was heated under reflux conditions int he presence of a solution of 0.05M solution of gallium nitrate [$Ga(NO)_3$.13 $H_2O$ from Aldrich] using 260 ml of solution for 300 g of zeolite then eliminating the solution by filtration. The resulting material was washed with 500 ml of distilled water, dried at 120° C. for 10 hours and finally activated in the air at 540° C. for 10 hours. Its content in $Ga_2O_3$ as determined by means of atomic absorption technique, was 2.9 wt %. The final catalyst which contained 80 wt % of such a gallium modified zeolite and 20 wt % of bentonite was tested under the same reaction conditions and with the same feed as in Example 26. The product distribution obtained with such a catalyst is reported in Table 5, col. 28.

TABLE 4
Effect of NiO loading on the coprecipitate

| | EXAMPLE | | |
|---|---|---|---|
| | 23 | 24 | 25 |
| PRODUCT DISTRIBUTION (wt %) | | | |
| METHANE | 17.7 | 17.7 | 17.8 |
| ETHYLENE | 6.5 | 8.9 | 8.9 |
| ETHANE | 3.3 | 3.6 | 3.9 |
| PROPYLENE | 8.8 | 6.8 | 6.7 |
| PROPANE | 35.9 | 28.7 | 27.4 |
| BUTANES | 5.7 | 2.8 | 2.4 |
| BUTENES (+ BUTADIENES) | 3.8 | 2.4 | 2.1 |
| $C_5^+$ ALIPHATICS (*) | 3.6 | 2.7 | 2.3 |
| AROMATICS | 14.7 | 26.4 | 28.5 |
| Total | 100.0 | 100.0 | 100.0 |
| BTX/TOTAL AROMATICS (wt) | 85 | 89 | 89 |
| COMPOSITION OF THE BTX AROMATICS (wt %) | | | |
| BENZENE | 25.5 | 27.3 | 27.1 |
| TOLUENE | 37.9 | 41.4 | 43.0 |
| ETHYLBENZENE | 0.2 | 0.1 | 0.2 |
| XYLENES | 36.4 | 31.1 | 29.5 |
| STYRENE | 0.1 | 0.1 | 0.2 |
| Total | 100.0 | 99.9 | 100.0 |

(*) $C_5^+$ ALIPHATICS: Aliphatic hydrocarbons having at least 5 C atoms.

TABLE 5
Effect of gallium oxide incorporated into the zeolite

| | EXAMPLE | | |
|---|---|---|---|
| | 26 | 27 | 28 |
| PRODUCT DISTRIBUTION (wt %) | | | |
| METHANE | 18.1 | 18.8 | 18.1 |

TABLE 5-continued

Effect of gallium oxide incorporated into the zeolite

| | EXAMPLE | | |
|---|---|---|---|
| | 26 | 27 | 28 |
| ETHYLENE | 10.2 | 15.3 | 11.5 |
| ETHANE | 2.7 | 3.7 | 3.0 |
| PROPYLENE | 12.1 | 9.2 | 7.8 |
| PROPANE | 29.6 | 23.2 | 25.7 |
| BUTANES | 4.3 | 1.8 | 2.7 |
| BUTENES (+ BUTADIENES) | 5.6 | 3.1 | 2.5 |
| $C_5$ ALIPHATICS (*) | 5.4 | 3.4 | 3.3 |
| AROMATICS | 12.0 | 21.5 | 25.5 |
| Total | 100.0 | 100.0 | 100.0 |
| BTX/TOTAL AROMATICS (wt %) | 89 | 90 | 88 |
| COMPOSITION OF THE BTX AROMATICS (wt %) | | | |
| BENZENE | 23.2 | 25.7 | 25.3 |
| TOLUENE | 34.9 | 39.0 | 41.4 |
| ETHYLBENZENE | 6.1 | 8.0 | 6.0 |
| XYLENES | 35.7 | 27.1 | 27.2 |
| STYRENE | 0.2 | 0.2 | 0.1 |
| Total | 100.1 | 100.0 | 100.0 |

(*) $C_5^+$ ALIPHATICS: Aliphatic hyrocarbons having at least 5 C atoms.

The examples 23–25 indicate that the improvement in the relative amount of aromatics in the products of the aromatization process due to the use of the composite catalyst of the invention can be further extended by the addition of certain amount of nickel oxide.

The examples 26–28 illustrates the advantage of gallium modified catalyst of the invention.

The aforegoing examples serve to illustrate certain specific embodiments of the invention. The examples should not however be construed as limiting the scope of the invention, such scope to be defined by the appended claims.

We claim:

1. A composite catalyst for the aromatization of olefins and/or paraffins, comprising a mixture of a pentasil type zeolite having the structure of ZSM-5 or ZSM-11 with a zinc oxide/alumina co-precipitate.

2. A catalyst according to claim 1 wherein the pentasil type zeolite has a Si/Al atomic ratio in the range 25 to 50.

3. A catalyst according to claim 1 wherein the weight ratio of the zeolite to the co-precipitate is in the range from 4.3 to 28.3.

4. A catalyst according to claims 1 or 2 wherein the Zn/Al atomic ratio in the co-precipitate is in the range 0.16 to 25.0.

5. A catalyst according to claims 1 or 2 wherein the weight ratio of the zeolite to the co-precipitate is in the range from 7 to 15.

6. A catalyst according to claims 1, 2 or 3 wherein the zeolite component is in the hydrogen form.

7. A catalyst according to claim 1, further comprising nickel oxide in the co-precipitate component in the amount from 0.5 wt % to 3 wt % based upon the weight of the co-precipitate.

8. A catalyst according to claim 1 further comprising a binder, in the amount from about 1 wt % to about 60 wt % based upon the total weight of the composition.

9. A catalyst according to claims 1, 3 or 7 which contains gallium oxide, in the amount from 0.5 wt % to 5 wt % based upon the weight of the zeolite component.

10. A catalyst according to claim 8 wherein the binder is bentonite.

11. A method of preparing a composite catalyst for the aromatization of olefins and/or paraffins which comprises
(a) reacting a liquid mixture of a soluble zinc salt and a soluble aluminum salt with an alkaline precipitating agent so as to obtain a precipitated mixture of zinc oxide and aluminum oxide,
(b) separating and drying the co-precipitate,
(c) intimately mixing the co-precipitate with a pentasil type zeolite having the structure of ZSM-5 or ZSM-11, and
(d) activating the catalyst at an elevated temperature.

12. A method according to claim 11 wherein a binder is admixed to the mixture of zeolite and co-precipitate during or after step (c).

13. A method according to claim 11 wherein the weight ratio of the zeolite to the co-precipitate is in the range from 4.3 to 28.3.

14. A method according to claim 13 wherein the Zn/Al atomic ratio in the co-precipitate is in the range 0.16 to 25.

* * * * *